United States Patent
Zhang (10) Patent No.: US 11,426,027 B2
(45) Date of Patent: Aug. 30, 2022

(54) AIR FRYER WITH STEAMING FUNCTION AND METHOD FOR CONTROLLING AIR FRYER WITH STEAMING FUNCTION

(71) Applicant: NINGBO CARELINE ELECTRIC APPLIANCE CO., LTD., Ningbo (CN)

(72) Inventor: Yichi Zhang, Ningbo (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 24 days.

(21) Appl. No.: 17/105,625

(22) Filed: Nov. 26, 2020

(65) Prior Publication Data

US 2021/0298522 A1    Sep. 30, 2021

(30) Foreign Application Priority Data

Mar. 25, 2020  (CN) .......................... 202010219162.X
Mar. 25, 2020  (CN) .......................... 202010219165.3
Mar. 25, 2020  (CN) .......................... 202010219205.4

(51) Int. Cl.
| | |
|---|---|
| A47J 37/06 | (2006.01) |
| A23L 5/10 | (2016.01) |
| A47J 27/04 | (2006.01) |
| A47J 36/32 | (2006.01) |
| A47J 36/42 | (2006.01) |

(52) U.S. Cl.
CPC ............. *A47J 37/0641* (2013.01); *A23L 5/13* (2016.08); *A47J 27/04* (2013.01); *A47J 36/32* (2013.01); *A47J 36/42* (2013.01); *A23V 2002/00* (2013.01); *A47J 2027/043* (2013.01); *A47J 2202/00* (2013.01); *A47J 2203/00* (2013.01)

(58) Field of Classification Search
CPC .. A47J 37/0641; A47J 27/04; A47J 2027/043; A23L 5/13
See application file for complete search history.

(56) References Cited

U.S. PATENT DOCUMENTS

| | | | |
|---|---|---|---|
| 6,100,502 A | 8/2000 | Sham et al. | |
| 6,267,046 B1 * | 7/2001 | Wanat | A47J 27/05 99/332 |

(Continued)

FOREIGN PATENT DOCUMENTS

| | | |
|---|---|---|
| AU | 2020277203 B1 | 8/2021 |
| CN | 103892698 A | 7/2014 |

(Continued)

*Primary Examiner* — John J Norton
(74) *Attorney, Agent, or Firm* — Bayramoglu Law Offices LLC (57) ABSTRACT

An air fryer with a steaming function includes a cooking chamber and a water tank arranged inside a housing. A steam generator is also arranged in the air fryer. A heating chamber is provided in the steam generator. The heating chamber in the steam generator is connected to a water tank via a water pump. High-temperature steam produced in the heating chamber of the steam generator is introduced into the cooking chamber. The steam generator is equipped with an over-temperature protector and a temperature sensor. Each of the over-temperature protector, the temperature sensor, the water pump, and the steam generator is electrically connected to the controller.

17 Claims, 5 Drawing Sheets

(56) References Cited

U.S. PATENT DOCUMENTS

| | | | | |
|---|---|---|---|---|
| 2016/0066738 | A1* | 3/2016 | Shibuya | F24C 15/327 219/401 |
| 2017/0007064 | A1* | 1/2017 | Chen | A47J 27/04 |
| 2017/0245683 | A1* | 8/2017 | Chen | F24C 15/325 |
| 2018/0325313 | A1* | 11/2018 | De' Longhi | A47J 43/046 |
| 2019/0309957 | A1* | 10/2019 | Buschman | F24C 15/327 |
| 2020/0281355 | A1* | 9/2020 | Carnevali | A47J 27/04 |
| 2021/0298522 | A1 | 9/2021 | Zhang | |

FOREIGN PATENT DOCUMENTS

| | | | | |
|---|---|---|---|---|
| CN | 104013302 | A | * | 9/2014 |
| CN | 104013302 | A | | 9/2014 |
| CN | 203987506 | U | | 12/2014 |
| CN | 206252370 | U | | 6/2017 |
| CN | 206822865 | U | | 1/2018 |
| CN | 107822524 | A | * | 3/2018 |
| CN | 107822524 | A | | 3/2018 |
| CN | 108324965 | A | | 7/2018 |
| CN | 109259580 | A | | 1/2019 |
| CN | 110179329 | A | | 8/2019 |
| CN | 209269447 | U | | 8/2019 |
| CN | 110558832 | A | | 12/2019 |
| CN | 110731702 | A | | 1/2020 |
| CN | 111387837 | A | | 7/2020 |
| CN | 111449536 | A | | 7/2020 |
| CN | 111543865 | A | | 8/2020 |
| EP | 3884820 | A1 | | 9/2021 |
| KR | 20210119873 | A | | 10/2021 |
| WO | 2016062513 | A1 | | 4/2016 |
| WO | 2017072068 | A1 | | 5/2017 |
| WO | 2017178229 | A1 | | 10/2017 |

* cited by examiner

FIG. 6

AIR FRYER WITH STEAMING FUNCTION AND METHOD FOR CONTROLLING AIR FRYER WITH STEAMING FUNCTION

CROSS-REFERENCE TO RELATED APPLICATIONS

This application claims priority to Chinese Patent Application No. 202010219162.X filed with the Chinese Patent Office on Mar. 25, 2020, entitled "Steam Generation System and Control Method for Air Fryer with Steaming Function", Chinese Patent Application No. 202010219165.3 filed with the Chinese Patent Office on Mar. 25, 2020, entitled "Steam Generator and Steaming/Roasting Control Method for Air Fryer with Steaming Function", and Chinese Patent Application No. 202010219205.4 filed with the Chinese Patent Office on Mar. 25, 2020, entitled "Method for Controlling Air Fryer with Steaming Function", which are incorporated herein by reference in their entireties.

TECHNICAL FIELD

The present disclosure relates to the field of air fryers, and in particular to an air fryer with a steaming function and a method for controlling an air fryer with a steaming function.

BACKGROUND

All the current air fryers heat food by using heating tubes. Food to be heated is placed inside an air fryer. A heating element is mounted inside the air fryer. Heat generated by the heating element heats a casing of the air fryer by means of convection. Due to the influence of the heat conducting time for the various components of the air fryer, the temperature inside the air fryer is actually not uniform. A part of food near the heating element has a higher temperature, while its back side and interior have lower temperatures. Since the temperature inside the air fryer is extremely non-uniform, the roasted food is often partially overcooked, or some food is undercooked. Especially the interior of food with a larger size can hardly be roasted thoroughly.

Of course, auxiliary air supply systems are additionally arranged in some air fryers to ensure more uniform temperatures inside the air fryers, so as to reduce the problems of overcooking and undercooking of food. However, food products to be roasted by users are quite different and have different sizes and shapes. Therefore, when more food or food with a larger size is contained in the air fryer, the problems such as overcooking and undercooking will still occur in places where the air supply system cannot reach (such as the interior of the food and the corners of the air fryer).

In order to prevent the problems of overcooking and undercooking, only an observation window is added to the current air fryer to observe the state of food in real time. If an abnormality occurs, the user shuts down the air fryer immediately, opens the door of the casing, and turns the food over to roast the food again. The above operations are repeated until the food is roasted thoroughly. In this roasting manner, the user needs to keep an eye on the food being roasted, and especially non-professional ordinary users can hardly roast food with a good cooking effect. It is very inconvenient to use such air fryer.

In addition, when the door is opened and the food is turned over, more heat will be lost, whereby the heating efficiency is significantly reduced, and the roasting time is prolonged. Moreover, the taste, color, and nutrition of some food will be affected during roasting, thus the roasting cooking mode is not available in actual use.

Air fryers with steaming function have been commercially available. Each of the air fryers with steaming function should be provided with a water tank to make steam. It is inconvenient to add water to the water tank during cooking. It is often necessary to mount a relatively large water tank so that a full tank of water can be used for a sufficient time and that there is sufficient steam to cook food thoroughly. However, a relatively large water tank will result in an unsightly and unreasonable layout of the air fryer. Therefore, it is very necessary to arrange a water tank and control the amount of water to be used. Moreover, when the steam function is included in the air fryer, problems such as water accumulation and incrustation scale will occur in the structures such as the water tank and the water pipeline. Furthermore, some food residues or oil stains may remain in some tiny spaces in the cooking chamber. Moreover, incrustation scale will be generated inside the steam generator that is used for a long time, which will affect the efficiency of generation of steam. Therefore, it is necessary to clean off the incrustation scale in time. However, the user is unable to known when to clean off the incrustation scale. These problems may be solved by adjusting a control method.

SUMMARY

The following technical solutions are disclosed in the present disclosure.

An air fryer with a steaming function is disclosed. The air fryer includes a cooking chamber and a water tank arranged inside a housing, wherein the air fryer is further provided therein with a control unit and a steam generator. A heating chamber is provided in the steam generator. The heating chamber in the steam generator is connected to the water tank via a water pump. High-temperature steam produced in the heating chamber of the steam generator is introduced into the cooking chamber. A chamber temperature sensor is arranged in the cooking chamber. Each of the chamber temperature sensor, the steam generator, and the water pump is electrically connected to the control unit. The cooking chamber has a volume of 5 to 10 L. The water tank has a volume of 500 to 1,500 mL.

BRIEF DESCRIPTION OF THE DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

Reference Numerals: 1. housing (main body); 2. water tank; 3. cooking chamber; 4. water pump; 5. steam generator; 6. water supply pipe; 7. adapting member; 8. steam adapter (adapter); 9, steam generator supporting frame (supporting frame); 10. secondary water tank; 11. water level sensor (liquid level sensor); 12. over-temperature protector (temperature controller); 13. temperature sensor (steam generator temperature sensor); 03. chamber temperature sensor.

DETAILED DESCRIPTION OF THE EMBODIMENTS

In order to further clarify the objectives, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that the terms such as "up", "down", "inside", and "outside", if present, indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first" and "second", if present, are used for distinguishing the description only, and should not be understood as an indication or implication of relative importance.

In addition, the term "horizontal", "vertical", "overhanging", or the like means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that the terms "arrange", "mount", "link", and "connect" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the features in the embodiments of the present disclosure may be combined with each other without conflict.

The present disclosure provides an air fryer with a steaming function and a method for controlling an air fryer with a steaming function, in order to solve at least one of the above-mentioned technical problems.

The following technical solutions are disclosed in the present disclosure.

An air fryer with a steaming function is disclosed. The air fryer includes a cooking chamber and a water tank arranged inside a housing, wherein the air fryer is further provided therein with a control unit and a steam generator. A heating chamber is provided in the steam generator. The heating chamber in the steam generator is connected to the water tank via a water pump. High-temperature steam produced in the heating chamber of the steam generator is introduced into the cooking chamber. A chamber temperature sensor is arranged in the cooking chamber. Each of the chamber temperature sensor, the steam generator, and the water pump is electrically connected to the control unit. The cooking chamber has a volume of 5 to 10 L. The water tank has a volume of 500 to 1,500 mL.

In one or more embodiments, the water tank includes a main water tank and a secondary water tank mounted at a lower end of the main water tank. The main water tank is detachably mounted onto the secondary water tank. The main water tank has a volume of 500 to 1,500 mL. The secondary water tank communicates with the main water tank. The water pump is connected to the secondary water tank. A water level sensor is mounted at a bottom of inner side of the secondary water tank. The water level sensor is electrically connected to the control unit.

In one or more embodiments, the steam generator is equipped with an over-temperature protector and a temperature sensor. Both the over-temperature protector and the temperature sensor are electrically connected to the control unit.

In one or more embodiments, a one-way valve is mounted at a steam outlet end of the heating chamber of the steam generator.

In one or more embodiments, a steam outlet end of the one-way valve is connected to a steam adapter via an adapting member. One end of the steam adapter leads into the cooking chamber. A plurality of corresponding steam transmission holes are arranged side by side in both the adapting member and the steam adapter.

In one or more embodiments, the steam generator includes a sealed housing casting. Each of the heating chamber, the over-temperature protector, and the temperature sensor is arranged in the housing casting.

A method for controlling an air fryer with a steaming function is disclosed. The air fryer includes a cooking chamber and a water tank arranged inside a housing. The air fryer is further provided therein with a control unit and a steam generator. A heating chamber is provided in the steam generator. The heating chamber in the steam generator is connected to the water tank via a water pump. High-temperature steam produced in the heating chamber of the steam generator is introduced into the cooking chamber. A chamber temperature sensor is arranged in the cooking chamber. Each of the chamber temperature sensor, the steam generator, and the water pump is electrically connected to the control unit. The cooking chamber has a volume of 5 to 10 L. The water tank has a volume of 500 to 1,500 mL. The method for controlling an air fryer with a steaming function includes the steps of:

S1: filling the water tank with water needed to generate steam, and controlling, when it is necessary to generate steam, the heating chamber of the steam generator to be preheated, and causing the controller (control unit) to automatically activate the water pump connected to a water pipe, to inject water in the water tank from the water tank into the steam generator through a connecting pipeline, when a temperature sensor detects that the temperature of the heating chamber increases to a temperature T1 required for vaporization of the liquid; and S2: causing the water in the heating chamber to has its temperature rapidly increased to the vaporization temperature and be vaporized into water steam, such that its volume expands violently and a certain pressure is created to push the one-way valve so that the water steam at high temperature and at high pressure is discharged to the cooking chamber through a steam pipeline, to heat food.

In one or more embodiments, the method for controlling an air fryer with a steaming function further includes a step of:

S3: causing the controller to automatically deactivate the water pump or reduce the flow rate from the water pump, when the temperature sensor detects that the temperature in the steam generator fails to reach the vaporization temperature T2.

In one or more embodiments, the method for controlling an air fryer with a steaming function further includes a step of:

S4: using the chamber temperature sensor to detect the temperature T in the cooking chamber and send it to the control unit, and performing control to reduce an amount of water pumped by the water pump and/or reduce the power of the steam generator, when it is detected that $T \geq T_0$.

In one or more embodiments, the $T_0$ is set between 90° C. and 95° C.

In one or more embodiments, the control unit reduces the amount of water pumped by the water pump by adjusting timing of starting and stopping of the water pump.

In one or more embodiments, the control unit reduces the amount of water pumped by the water pump by adjusting a working frequency of the water pump.

In one or more embodiments, a water level sensor is mounted at the bottom of the water tank. When the water level sensor senses that there is a lack of water, the steam generator and the water pump are controlled to be deactivated, and it is prompted that it is necessary to add water.

In one or more embodiments, a one-key pumping button is provided on the housing. A pumping instruction is sent to the control unit by pressing the one-key pumping button. When the control unit receives the pumping instruction, the control unit controls the water pump to start working, so that the residual water accumulated in the water tank is completely pumped out by the water pump.

In one or more embodiments, a liquid level sensor (water level sensor) is mounted at the bottom of the water tank for sending, to the control unit, a signal indicating that water has been completely pumped out, to control the water pump to stop working.

In one or more embodiments, a one-key cleaning button is provided on the housing. A cleaning instruction is sent to the control unit by pressing the button. When the control unit receives the cleaning instruction, the control unit controls the water pump and the steam generator to work, so that the steam generator sprays high-temperature steam into the cooking chamber to clean and disinfect tiny spaces inside the cooking chamber.

In one or more embodiments, the steam sprayed from the steam generator, after the one-key cleaning button is pressed, has a temperature higher than the temperature of the steam generated during normal cooking.

In one or more embodiments, the one-key cleaning step includes two steps of:

S1: adding a little disinfectant or detergent to the water tank and generating disinfectant steam by the steam generator to clean and disinfect each position in the cooking chamber before use; and S2: adding clean water to the water tank and generating high-temperature water steam by the steam generator to further clean each position in the cooking chamber after the disinfectant is completely used.

In one or more embodiments, a temperature sensor is mounted in the steam generator. The temperature of the heating chamber inside the steam generator is detected by the temperature sensor. The control unit detects a temperature change rate during heating, detects whether incrustation scale is generated in the heating chamber by comparing changes in the temperature change rate, and prompts to remove the incrustation scale from the steam generator.

In one or more embodiments, the control unit includes a timing unit, and a time T0 during which the steam generator is theoretically used is set. The timing unit is configured to calculate a time T during which the steam generator is actually used. The control unit prompts to remove incrustation scale from the steam generator when $T \geq T0$.

A steam generation system for an air fryer with a steaming function is disclosed. The air fryer includes a main body and a cooking chamber arranged inside the main body, wherein the steam generation system includes a controller, and a water tank, a water pump and a steam generator communicating with one another in sequence. The steam generator is configured to spray steam into the cooking chamber. The controller is electrically connected to each of the water pump and the steam generator.

A chamber temperature sensor is provided in the cooking chamber. The chamber temperature sensor is electrically connected to the controller for detecting the temperature T in the chamber and sending it to the controller.

The controller is configured to perform control to reduce an amount of water pumped by the water pump and/or reduce the power of the steam generator when it is detected that $T \geq T_0$.

In one or more embodiments, the $T_0$ is set between 90° C. and 95° C.

In one or more embodiments, the cooking chamber has a volume of 5 to 10 L, and the water tank has a volume of 500 to 1,500 mL.

In one or more embodiments, the water tank includes a main water tank and a secondary water tank located at the lower end of the main water tank. The secondary water tank communicates with the main water tank. The water pump is connected to the secondary water tank. A liquid level sensor is mounted at the bottom of the secondary water tank. The liquid level sensor is also connected to the controller.

In one or more embodiments, a steam generator temperature sensor is mounted in the steam generator.

In one or more embodiments, an adapter is mounted at the lower end of the steam generator. A plurality of vent holes are arranged evenly in the adapter such that high-temperature steam is introduced into the cooking chamber therethrough.

In one or more embodiments, the steam generator is mounted fixedly in the main body by means of a supporting frame.

A method for controlling the steam generation system for an air fryer with a steaming function specifically includes the steps of:

S1: setting a temperature $T_0$ in the controller;

S2: causing the chamber temperature sensor to always monitor the temperature T in the cooking chamber and feed it back to the controller; and S3: performing control by the controller to reduce the amount of water pumped by the water pump and/or reduce the power of the steam generator when it is detected that $T \geq T_0$.

In one or more embodiments, the controller reduces the amount of water pumped by the water pump by adjusting timing of starting and stopping of the water pump.

In one or more embodiments, the controller reduces the amount of water pumped by the water pump by adjusting the working frequency of the water pump.

A steam generator for an air fryer with a steaming function is disclosed. The air fryer includes a cooking chamber and a water tank arranged inside a housing, wherein a steam generator is also arranged in the air fryer. A heating chamber is provided in the steam generator. The heating chamber in the steam generator is connected to the water tank via a water pump. High-temperature steam produced in the heating chamber of the steam generator is introduced into the cooking chamber. The steam generator is equipped with an over-temperature protector and a temperature sensor. Each of the over-temperature protector, the temperature sensor, the water pump, and the steam generator is electrically connected to the controller.

In one or more embodiments, the steam generator is mounted fixedly in the housing by being embedded into a steam generator supporting frame.

In one or more embodiments, a one-way valve is mounted at the steam outlet end of the heating chamber of the steam generator.

In one or more embodiments, a water supply pipe communicating with the heating chamber of the steam generator is mounted on one side of the steam generator. The water supply pipe is connected to the water pump via a water pipe.

In one or more embodiments, the steam outlet end of the one-way valve is connected to a steam adapter via an adapting member. One end of the steam adapter leads into the cooking chamber.

In one or more embodiments, a plurality of corresponding steam transmission holes are arranged side by side in both the adapting member and the steam adapter.

In one or more embodiments, the water tank includes a main water tank and a secondary water tank mounted at the lower end of the main water tank. The secondary water tank communicates with the main water tank. The water pump is connected to the secondary water tank. A water level sensor is mounted at the bottom of inner side of the secondary water tank.

In one or more embodiments, the steam generator includes a sealed housing casting. Each of the heating chamber, the over-temperature protector, and the temperature sensor is arranged in the housing casting.

A steaming/roasting control method for the steam generator for an air fryer with a steaming function specifically includes the steps of:

S1: filling the water tank with water needed to generate steam, and controlling, when it is necessary to generate steam, the heating chamber of the steam generator to be preheated by the controller, and causing the controller to automatically activate the water pump connected to a water pipe, to inject water in the water tank from the water tank into the steam generator through a connecting pipeline, when the temperature sensor detects that the temperature of the heating chamber increases to a temperature T1 required for vaporization of the liquid;

S2: causing the water in the heating chamber to has its temperature rapidly increased to the vaporization temperature and be vaporized into water steam, such that its volume expands violently and a certain pressure is created to push the one-way valve, so that the water steam at high temperature and at high pressure is discharged to the cooking chamber through a steam pipeline, to heat food; and S3: causing the controller to automatically deactivate the water pump or reduce the flow rate from the water pump when the temperature sensor detects that the temperature in the steam generator fails to reach the vaporization temperature T2.

In one or more embodiments, a water level sensor is mounted at the bottom of the water tank. When the water level sensor senses that there is a lack of water, the controller automatically deactivates the steam generator and the water pump and prompts that it is necessary to add water.

A method for controlling an air fryer with a steaming function is disclosed. The air fryer includes a cooking chamber arranged inside a housing, wherein a control unit is arranged inside the air fryer. The air fryer is provided with a water tank which is connected to a steam generator via a water pump. Steam is generated by the steam generator and introduced into the cooking chamber. A one-key pumping button is provided on the housing. A pumping instruction is sent to the control unit by pressing the one-key pumping button. When the control unit receives the pumping instruction, the control unit controls the water pump to start working so that the residual water accumulated in the water tank is completely pumped out by the water pump.

In one or more embodiments, a liquid level sensor is mounted at the bottom of the water tank for sending a signal indicating that water has been completely pumped out.

In one or more embodiments, the water tank includes a main water tank and a secondary water tank arranged at the lower end of the main water tank and communicating with the main water tank. The water pump is connected to the secondary water tank via a water pipe.

In one or more embodiments, a one-key cleaning button is provided on the housing. A cleaning instruction is sent to the control unit by pressing the button. When the control unit receives the cleaning instruction, the control unit controls the water pump and the steam generator to work so that the steam generator sprays high-temperature steam into the cooking chamber to clean and disinfect tiny spaces inside the cooking chamber.

In one or more embodiments, the steam sprayed from the steam generator after the one-key cleaning button is pressed has a temperature higher than the temperature of the steam generated during normal cooking.

In one or more embodiments, the one-key cleaning step includes two steps of:

S1: adding a little disinfectant or detergent to the water tank and generating disinfectant steam by the steam generator to clean and disinfect each position in the cooking chamber before use; and S2: adding clean water to the water tank and generating high-temperature water steam by the steam generator to further clean each position in the cooking chamber after the disinfectant is completely used.

In one or more embodiments, the air fryer includes a cooking chamber arranged inside a housing. A control unit is arranged inside the air fryer. The air fryer is provided with a water tank which is connected to a steam generator via a water pump. Steam is generated by the steam generator and introduced into the cooking chamber. A temperature sensor is mounted in the steam generator. The temperature of the heating chamber inside the steam generator is detected by the temperature sensor. A temperature change rate during heating is detected, and changes in the temperature change rate are compared to detect whether incrustation scale is generated in the heating chamber.

In one or more embodiments, the air fryer includes a cooking chamber arranged inside a housing. A control unit is arranged inside the air fryer. The air fryer is provided with a water tank which is connected to a steam generator via a water pump. Steam is generated by the steam generator and introduced into the cooking chamber. The control unit includes a timing unit, and a time T0 during which the steam generator is theoretically used is set. The timing unit is configured to calculate a time T during which the steam generator is actually used. The control unit prompts to remove incrustation scale and recommends the user to remove the incrustation scale when T≥T0.

In one or more embodiments, a control panel communicating with the control unit is arranged on the outer side of the air fryer.

In one or more embodiments, a temperature sensor is mounted in each of the cooking chamber and the steam generator.

The object of the present disclosure includes, for example, providing a steam generator and a steaming/roasting control method for an air fry with a steaming function. A straight-through electric heating steam generator with high thermal efficiency, fast steam generation speed, less steam spray, and low noise is coordinated with a corresponding control system to meet the requirement of adding the function of heating food with steam to the electric air fryer.

The present disclosure provides a steam generator for an air fryer with a steaming function. The air fryer includes a cooking chamber and a water tank arranged inside a housing. A steam generator is also arranged in the air fryer. A heating chamber is provided in the steam generator. The heating chamber in the steam generator is connected to the water tank via a water pump. High-temperature steam produced in the heating chamber of the steam generator is introduced into the cooking chamber. The steam generator is equipped with an over-temperature protector and a temperature sensor. Each of the over-temperature protector, the temperature sensor, the water pump, and the steam generator is electrically connected to the controller.

In one or more embodiments, the steam generator is mounted fixedly in the housing by being embedded into a steam generator supporting frame. The steam generator supporting frame is in a housing-like structure with open side surfaces and an open end. The steam generator is in a generally cuboid shape and can be smoothly embedded into the steam generator supporting frame. This facilitates the detachment and maintenance of the steam generator.

In one or more embodiments, a one-way valve is mounted at the steam outlet end of the heating chamber of the steam generator. Backflow of steam can be effectively prevented by the one-way valve.

In one or more embodiments, a water supply pipe communicating with the heating chamber of the steam generator is mounted on one side of the steam generator. The water supply pipe is connected to the water pump via a water pipe. The water supply pipe facilitates connection of a silicone water pipe and can be conveniently inserted and withdrawn.

In one or more embodiments, the steam outlet end of the one-way valve is connected to a steam adapter via an adapting member. One end of the steam adapter leads into the cooking chamber. The adapting member allows the steam generator to be mounted with lower accuracy. Moreover, the adapting member can be cleaned easily and can be conveniently connected to the steam adapter.

Here, a plurality of corresponding steam transmission holes are arranged side by side in both the adapting member and the steam adapter. The plurality of steam transmission holes allow steam from the steam generator to be divided effectively without being concentrated. This facilitates uniform circulation of the steam in the cooking chamber.

In one or more embodiments, the water tank includes a main water tank and a secondary water tank mounted at the lower end of the main water tank. The secondary water tank communicates with the main water tank. The water pump is connected to the secondary water tank. A water level sensor is mounted at the bottom of inner side of the secondary water tank. The water level sensor can sense the level of water remaining in the secondary water tank to prevent it from drying out.

In one or more embodiments, the steam generator includes a sealed housing casting. Each of the heating chamber, the over-temperature protector, and the temperature sensor is arranged in the housing casting. The internal components of the steam generator are all enclosed in the housing casting, thus noise generated when the liquid is vaporized is blocked by the external housing casting so that noise will be significantly reduced during use. Moreover, it is relatively safe because water leakage will not occur.

In addition, the present disclosure also relates to a steaming/roasting control method for the steam generator for an air fryer with a steaming function. The method specifically includes the following steps:

step 1 of filling the water tank with water needed to generate steam, and controlling, when it is necessary to generate steam, the heating chamber of the steam generator to be preheated by the controller, and causing the controller to automatically activate the water pump connected to a water pipe to inject a certain amount of water in the water tank from the water tank into the steam generator through a connecting pipeline when the temperature sensor detects that the temperature of the heating chamber increases to a temperature required for vaporization of the liquid;

step 2 of causing the water in the heating chamber to has its temperature rapidly increased to the vaporization temperature and be vaporized into water steam, such that its volume expands violently and a certain pressure is created to push the one-way valve, so that the water steam at high temperature and at high pressure is discharged to the cooking chamber through a steam pipeline, to heat food; and step 3 of causing the controller to automatically deactivate the water pump or reduce the flow rate from the water pump when the temperature sensor detects that the temperature in the steam generator fails to reach the vaporization temperature, so as to ensure the balance between water supply and steam generation.

In one or more embodiments, when the water level sensor in the water tank senses that there is a lack of water in the above steps 2 and 3, the controller will automatically deactivate the steam generator and the water pump and prompt the user to add water. This improves the service life and reduces the heat loss of the steam generator and the water pump.

The object of the present disclosure also includes, for example, providing a steam generation system and a control method for an air fryer with a steaming function, in which a unique control module is used, and the volume of a cooking chamber and the volume of a water tank are set to match each other to ensure the practicability of the product.

The present disclosure also provides a steam generation system for an air fryer with a steaming function. The air fryer includes a main body and a cooking chamber arranged inside the main body. The steam generation system includes a controller, and a water tank, a water pump and a steam generator communicating with one another in sequence. The steam generator is configured to spray steam into the cooking chamber. The controller is electrically connected to each of the water pump and the steam generator.

A chamber temperature sensor is provided in the cooking chamber. The chamber temperature sensor is electrically connected to the controller for detecting the temperature T in the chamber and sending it to the controller.

Here, the controller is configured to perform control to reduce the amount of water pumped by the water pump and/or reduce the power of the steam generator when it is detected that $T \geq T_0$.

In one or more embodiments, the $T_0$ is set between 90° C. to 95° C.

The cooking chamber has a volume of 5 to 10 L, and the water tank has a volume of 500 to 1,500 mL. The size of the water tank may be adjusted according to the volume of the cooking chamber to achieve reasonable utilization.

The operation of the controller is adjusted according to data detected by the chamber temperature sensor and the steam generator temperature sensor. When the temperature of steam in the cooking chamber reaches a certain temperature, the amount of steam to be supplied is reduced to reduce energy loss while ensuring full use of water. In this way, the water in the water tank can be fully utilized to save water, as long as the volume of the cooking chamber corresponds to the volume of the water tank.

A steam generator temperature sensor is mounted in the steam generator. The steam generator temperature sensor can control the temperature of high-temperature steam to meet different cooking requirements.

In one or more embodiments, the water tank includes a main water tank and a secondary water tank located at the lower end of the main water tank. The secondary water tank communicates with the main water tank. The water pump is connected to the secondary water tank. The secondary water tank allows the water tank to be taken out conveniently and filled with water. A jacking structure is provided in the secondary water tank, so that water can flow down when the water tank is put thereon. Moreover, a liquid level sensor is mounted at the bottom of the secondary water tank, and the liquid level sensor is also connected to the controller. When the water in the water tank is used up or the water tank is taken out, the residual water in the secondary water tank can be detected by the liquid level sensor, and the operation of the water pump can be controlled by the controller to pump the residual water out of the secondary water tank.

Here, an adapter is mounted at the lower end of the steam generator. A plurality of vent holes are arranged evenly in the adapter such that high-temperature steam is introduced into the cooking chamber therethrough. The adapter can be conveniently cleaned and thus is more sanitary. High-temperature steam can be delivered evenly into the cooking chamber through the plurality of vent holes.

In one or more embodiments, the steam generator is mounted fixedly in the main body by means of a supporting frame.

The present disclosure also proposes a method for controlling the steam generation system for an air fryer. The method specifically includes the steps of:

S1: setting a temperature $T_0$ in the controller;

S2: causing the chamber temperature sensor to always monitor the temperature T in the cooking chamber and feed it back to the controller; and S3: performing control by the controller to reduce the amount of water pumped by the water pump and/or reduce the power of the steam generator when it is detected that $T \geq T_0$. In this way, the steam temperature is maintained with the lowest amount of steam supplied, thereby achieving the purpose of reducing the amount of water used, to prolong the time during which a tank of water is usable.

Here, there are two method for adjusting the amount of water pumped by the water pump. In the first method, the controller reduces the amount of water pumped by the water pump by adjusting timing of starting and stopping of the water pump. In the other method, the controller reduces the amount of water pumped by the water pump by adjusting the working frequency of the water pump. Both of these methods may be implemented by setting corresponding programs in the controller.

The object of the present disclosure also includes, for example, providing a method for controlling an air fryer with a steaming function. The control method allows effective removal of the accumulated water from the water tank and further allows cleaning and disinfection of the cooking chamber, and also involves the incrustation scale detection and reminding functions.

The present disclosure also provides a method for controlling an air fryer with a steaming function. The air fryer includes a cooking chamber arranged inside a housing. A control unit is arranged inside the air fryer. The air fryer is provided with a water tank which is connected to a steam generator via a water pump. Steam is generated by the steam generator and introduced into the cooking chamber. A one-key pumping button is provided on the housing. A pumping instruction is sent to the control unit by pressing the one-key pumping button. When the control unit receives the pumping instruction, the control unit controls the water pump to start working so that the residual water accumulated in the water tank is completely pumped out by the water pump.

If the air fryer with a steaming function is not continued to be used after cooking is completed, it is necessary to completely pump the remaining water from the water tank in order to keep the water tank clean. The steam generator does not work when water is being pumped. Water remaining in the water tank is pumped into the cooking chamber by the water pump, and then it is only necessary to remove the water from the cooking chamber.

Here, a liquid level sensor is mounted at the bottom of the water tank for sending a signal indicating that water has been completely pumped out. When the liquid level sensor detects that the water level has reached the bottom, the water pump will be automatically controlled to stop working.

In one or more embodiments, the water tank includes a main water tank and a secondary water tank arranged at the lower end of the main water tank and communicating with the main water tank. The water pump is connected to the secondary water tank via a water pipe. The water tank can be separated from the secondary water tank so that it is convenient to remove the water tank and add water thereto. A drainage mechanism is arranged between the water tank and the secondary water tank. Water in the water tank firstly enters the secondary water tank, thus water is also accumulated in the secondary water tank. Therefore, a liquid level sensor is mounted at the bottom of the secondary water tank to ensure complete pumping of the water.

The present disclosure also includes another method for controlling an air fryer with a steaming function, wherein a one-key cleaning button is provided on the housing. A cleaning instruction is sent to the control unit by pressing the button. When the control unit receives the cleaning instruction, the control unit controls the water pump and the steam generator to work so that the steam generator sprays high-temperature steam into the cooking chamber to clean and disinfect tiny spaces inside the cooking chamber.

Here, the steam sprayed from the steam generator after the one-key cleaning button is pressed has a temperature higher than the temperature of the steam generated during normal cooking. The cleaning and disinfecting effects can be improved by the steam at a higher temperature.

In one or more embodiments, the one-key cleaning step includes the following two steps:

step 1: adding a little disinfectant or detergent to the water tank and generating disinfectant steam by the steam generator to clean and disinfect each position in the cooking chamber before use; and step 2: adding clean water to the water tank and generating high-temperature water steam by the steam generator to further clean each position in the cooking chamber after the disinfectant is completely used.

The present disclosure also includes a incrustation scale detection and reminding method for an air fryer with a steaming function. The air fryer includes a cooking chamber arranged inside a housing. A control unit is arranged inside the air fryer. The air fryer is provided with a water tank which is connected to a steam generator via a water pump. Steam is generated by the steam generator and introduced into the cooking chamber. A temperature sensor is mounted in the steam generator. The temperature of the heating chamber inside the steam generator is detected by the temperature sensor. A temperature change rate during heating is detected, and changes in the temperature change rate are compared to detect whether incrustation scale is generated in the heating chamber.

The present disclosure also includes another incrustation scale detection and reminding method for an air fryer with a steaming function. The air fryer includes a cooking chamber arranged inside a housing. A control unit is arranged inside the air fryer. The air fryer is provided with a water tank which is connected to a steam generator via a water pump. Steam is generated by the steam generator and introduced into the cooking chamber. The control unit includes a timing unit, and a time T0 during which the steam generator is theoretically used is set. The timing unit is configured to calculate a time T during which the steam generator is actually used. The control unit prompts to remove incrustation scale and recommends the user to remove the incrustation scale when $T \geq T0$.

In one or more embodiments, a control panel communicating with the control unit is arranged on the outer side of the air fryer. The control panel may be provided with buttons for controlling various functions and set with parameters, and may be provided with an indicator light and a speaker to meet the voice prompt function.

In one or more embodiments, a temperature sensor is mounted in each of the cooking chamber and the steam generator, to facilitate feedback and control of the temperatures of steam in the cooking chamber and in the steam generator, to facilitate control by the controller.

The present disclosure provides a steam generator and a steaming/roasting control method for an air fryer with a steaming function, and a method for controlling an air fryer with a steaming function. The entire process of generating steam by the steam generator is carried out inside a casting, thus heat loss is reduced during heat transfer. In addition, the amount of water supplied by the water pump is substantially in equilibrium with the amount of steam generated by the heater during heating, thus heat loss is reduced during heating of the liquid. All the heat energy generated by the heater is converted into steam and used for steam heating, whereby the thermal efficiency is significantly improved. Noise generated when the liquid is vaporized is blocked by the external casting, so that noise will be significantly reduced during use. In addition, a water level detection device is mounted at the lowest water level of the water tank. When there is a lack of water, the control system will automatically deactivate the steam generator and the water pump and prompt the user to add water, thereby improving the service life and reducing the heat loss of the steam generator and the water pump. When the water supply pipeline is blocked or other abnormal conditions occur, a temperature controller mounted to the casting will automatically turn off the heater to ensure the safety of the user. A straight-through electric heating steam generator with high thermal efficiency, fast steam generation speed, less steam spray, and low noise is coordinated with a corresponding control system to meet the requirement of adding the function of heating food with steam to the electric air fryer. A unique control module and components are used, and the volume of the cooking chamber and the volume of the water tank are set to match each other to ensure the practicability of the product. When steam is being produced, the starting, stopping, and working frequency of the water pump may be controlled to make full use of water to form steam. When the temperature of steam in the cooking chamber reaches a certain temperature during cooking, the amount of steam supplied may be reduced to reduce energy loss while ensuring full use of water. Moreover, this control method allows effective removal of the accumulated water from the water tank and the secondary water tank, further allows cleaning and disinfection of the cooking chamber with high-temperature steam, and allows detection and reminding of the incrustation scale state in the steam generator, so as to solve multiple technical problems of an air fryer with a steaming function. In this way, the air fryer is more sanitary during cooking and its service life is also prolonged to a certain extent.

The present disclosure will be described in further detail below in connection with specific embodiments.

Figure 1:
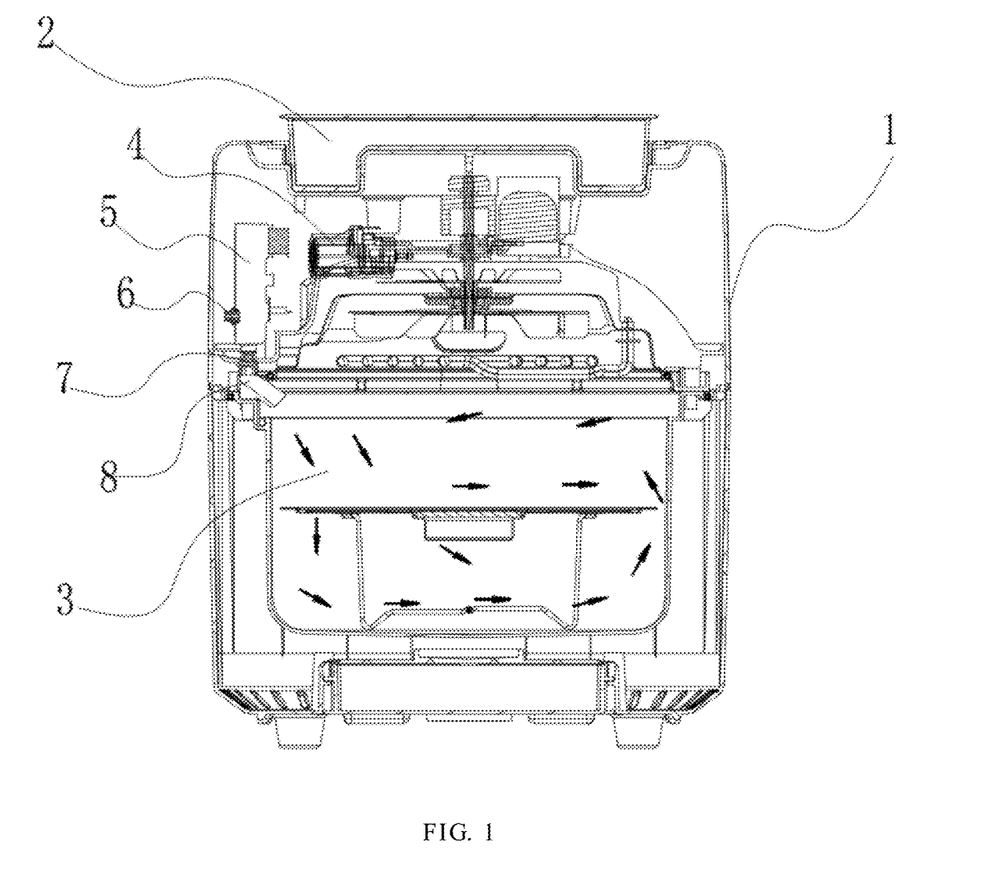
FIG. 1 is a schematic half-sectional view of a first structure of an air fryer with a steaming function including a steam generator according to the present disclosure.
Figure 2:
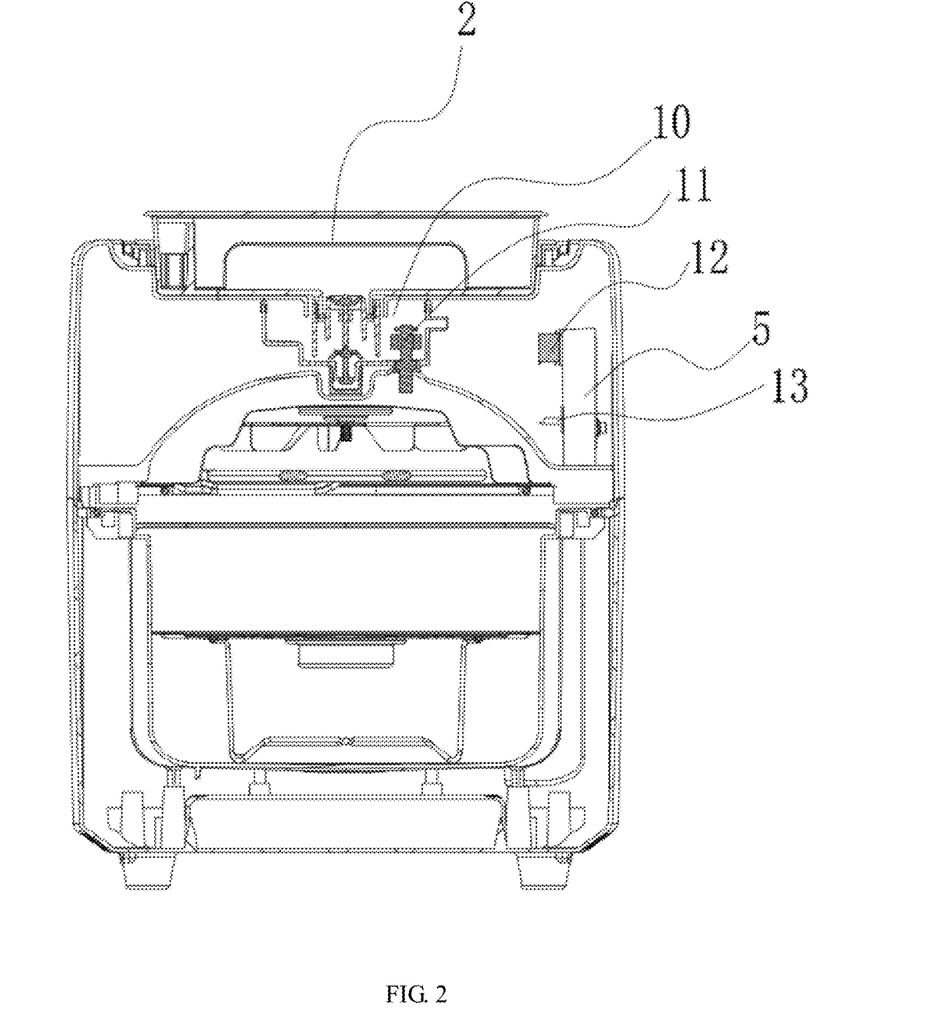
FIG. 2 is a schematic half-sectional view of a second structure of an air fryer with a steaming function including a steam generator according to the present disclosure.
Figure 3:
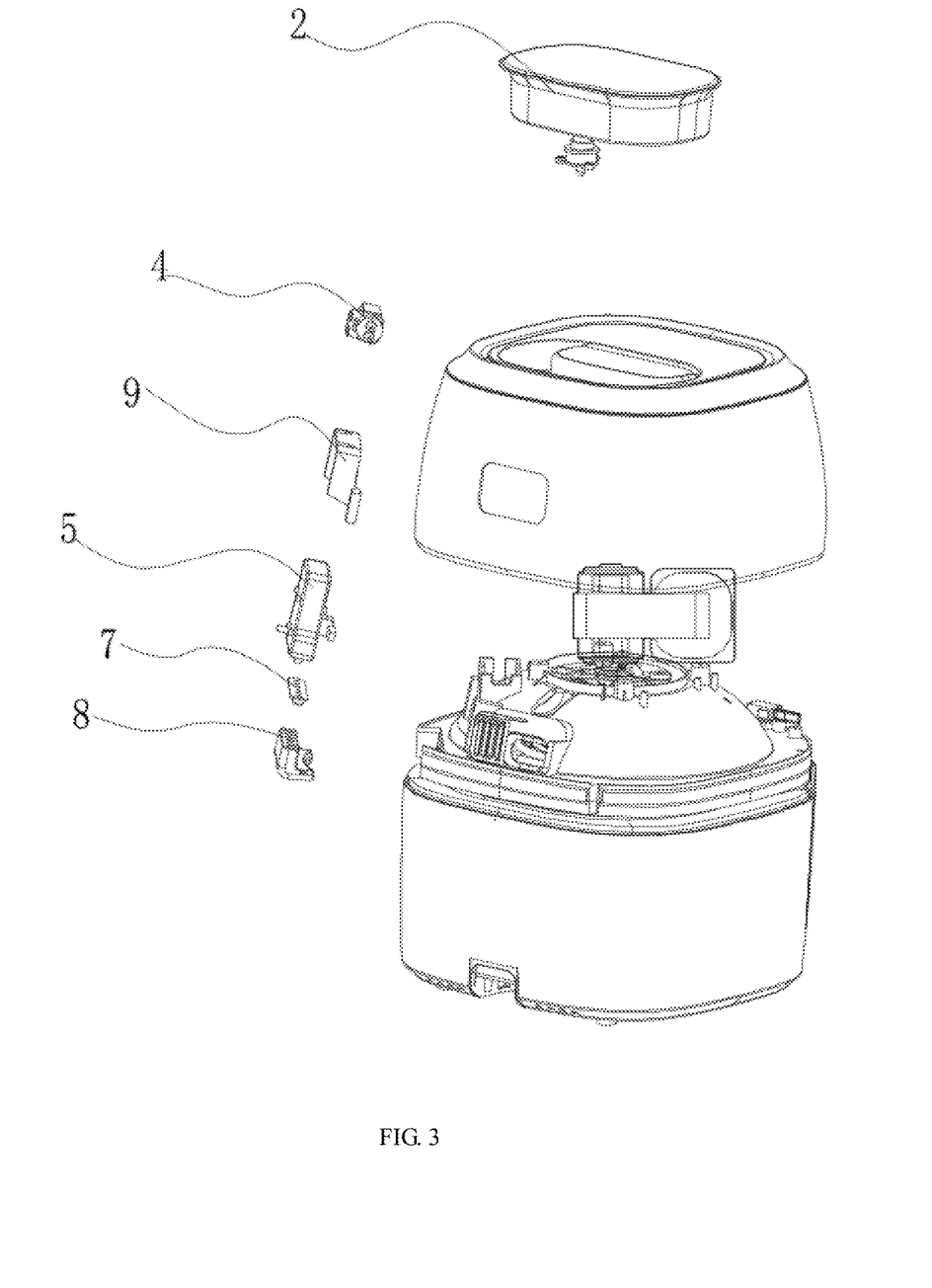
FIG. 3 is a schematic partial exploded perspective structural view of an air fryer with a steaming function including a steam generator according to the present disclosure.

As shown in FIGS. 1 to 3, an embodiment of the present disclosure relates to a steam generator for an air fryer with a steaming function. The air fryer includes a cooking chamber 3 and a water tank 2 arranged inside a housing 1. A steam generator 5 is also arranged in the air fryer. A heating chamber is provided in the steam generator 5. The heating chamber in the steam generator 5 is connected to the water tank 2 via a water pump 4. High-temperature steam produced in the heating chamber of the steam generator 5 is introduced into the cooking chamber 3. The steam generator 5 is equipped with an over-temperature protector 12 and a temperature sensor 13. Each of the over-temperature protector 12, the temperature sensor 13, the water pump 4, and the steam generator 5 is electrically connected to the controller.

The steam generator 5 is mounted and fixed in the housing 1 by being embedded into a steam generator supporting frame 9. The steam generator supporting frame 9 is in a housing-like structure with open side surfaces and an open end. The steam generator 5 is in a generally cuboid shape and can be smoothly embedded into the steam generator supporting frame 9. This facilitates the detachment and maintenance of the steam generator 5.

A one-way valve connected to the heating chamber is mounted at the lower end of the steam generator 5. Backflow of steam can be effectively prevented by the one-way valve.

A water supply pipe 6 communicating with the heating chamber is mounted on one side of the steam generator 5. The water supply pipe 6 is connected to the water pump 4 via a water pipe. The water supply pipe 6 facilitates connection of a silicone water pipe and can be conveniently inserted and withdrawn.

The steam outlet end of the one-way valve is connected to a steam adapter 8 via an adapting member 7. One end of the steam adapter 8 leads into the cooking chamber 3. The adapting member allows the steam generator to be mounted with lower accuracy. Moreover, the adapting member can be cleaned easily and can be conveniently connected to the steam adapter.

A plurality of corresponding steam transmission holes are arranged side by side in both the adapting member 7 and the steam adapter 8. The plurality of steam transmission holes allow steam from the steam generator 5 to be divided effectively without being concentrated. This facilitates uniform circulation of the steam in the cooking chamber 3.

The water tank 2 includes a main water tank and a secondary water tank 10 mounted at the lower end of the main water tank. The secondary water tank 10 communicates with the main water tank. The water pump 4 is connected to the secondary water tank 10. A water level sensor 11 is mounted at the bottom of inner side of the secondary water tank 10. The water level sensor 11 can sense the level of water remaining in the secondary water tank 10 to prevent it from drying out.

The steam generator 5 includes a sealed housing casting. Each of the heating chamber, the over-temperature protector 12, and the temperature sensor 13 is arranged in the housing casting. The internal components of the steam generator 5 are all enclosed in the housing casting, thus noise generated when the liquid is vaporized is blocked by the external housing casting so that noise will be significantly reduced during use. Moreover, it is relatively safe because water leakage will not occur.

As an embodiment of the present disclosure, a steaming/roasting control method for the steam generator for an air fryer described in the present disclosure specifically includes the following steps:

step 1 of filling the water tank 2 with water needed to generate steam, and controlling, when it is necessary to generate steam, the heating chamber of the steam generator 5 to be preheated by the controller, and causing the controller to automatically activate the water pump 4 connected to a water pipe to inject a certain amount of water in the water tank 2 from the water tank 2 into the steam generator 5 through a connecting pipeline when the temperature sensor 13 detects that the temperature of the heating chamber increases to a temperature required for vaporization of the liquid;

step 2 of causing the water in the heating chamber to has its temperature rapidly increased to the vaporization temperature and be vaporized into water steam such that its volume expands violently and a certain pressure is created to push the one-way valve so that the water steam at high temperature and at high pressure is discharged to the cooking chamber 3 through a steam pipeline to heat food; and step 3 of causing the controller to automatically deactivate the water pump 4 or reduce the flow rate from the water pump 4, to ensure a balance between the supply of water and the generation of steam, when the temperature sensor 13 detects that the temperature in the steam generator 5 fails to reach the vaporization temperature.

In addition, when the water level sensor 11 in the secondary water tank 10 senses that there is a lack of water in the above steps 2 and 3, the controller will automatically deactivate the steam generator 5 and the water pump 4 and prompt the user to add water. This improves the service life and reduces heat loss of the steam generator 5 and the water pump 4.

Specifically, after the steaming function is added to the air fryer, a user may select a steaming mode, a grilling mode, or a combined steaming and grilling mode as needed. An example will be given below to illustrate a practical application of an air fryer to which a steam generator and its controller are added. The water tank in this steam-type air fryer is mounted at the top of the air fryer (see FIG. 3) to facilitate addition of water by the user. The steam generator 5 and the water pump 4 are mounted to a casing, and the water tank 2, the water pump 4, and the steam generator 5 are connected in the air fryer by silicone tubes to form a complete water supply system. The steam generator 5 is equipped with a temperature sensor 13 and a temperature controller 12. A non-contact water level sensor 11 is mounted at the bottom of the water tank. A steaming mode button and a combined steaming and grilling mode button are added to the control panel. Other components (such as a heater, a fan, a casing temperature sensor) in the original air fryer and their related structures remain unchanged.

When the user needs to roast food with a larger size, the user may select a combined steaming and grilling mode to ensure a uniform temperature, and set the steaming time and the grilling temperature and time according to the requirements in the instruction manual, and then press the start button to turn on the air fryer. The air fryer will first activate the heater and the fan to preheat the casing, to improve the temperature increasing speed. When the controller detects that the temperature in the casing reaches a temperature suitable for steam heating (usually about 100° C.), the system will automatically deactivate the heater and the fan and switch to steam heating. Because the temperature inside the air fryer is very stable during steam heating, it can be ensured that both the interior and exterior of food can be fully cooked. Then, the steam heating is deactivated and the mode is switched to a grilling mode, to remove excess water from the interior of the food by baking. After the set grilling time and temperature are reached, the combined steaming and grilling mode is finished. During the whole cooking process, the controller will detect the temperature and water level of each of the components in real time and will automatically alarm when there is an abnormality. In this way, the roasted food has a steamed delicious flavor in its interior and has a roasted smell on its outer surface, and has better color and taste.

It can be seen that as for the steam generator of the present disclosure, a straight-through electric heating steam generator with a high thermal efficiency, a fast steam generation speed, less steam spray, and low noise is coordinated with a corresponding control system to meet the requirement of adding the function of heating food with steam to the electric air fryer.

Figure 4:
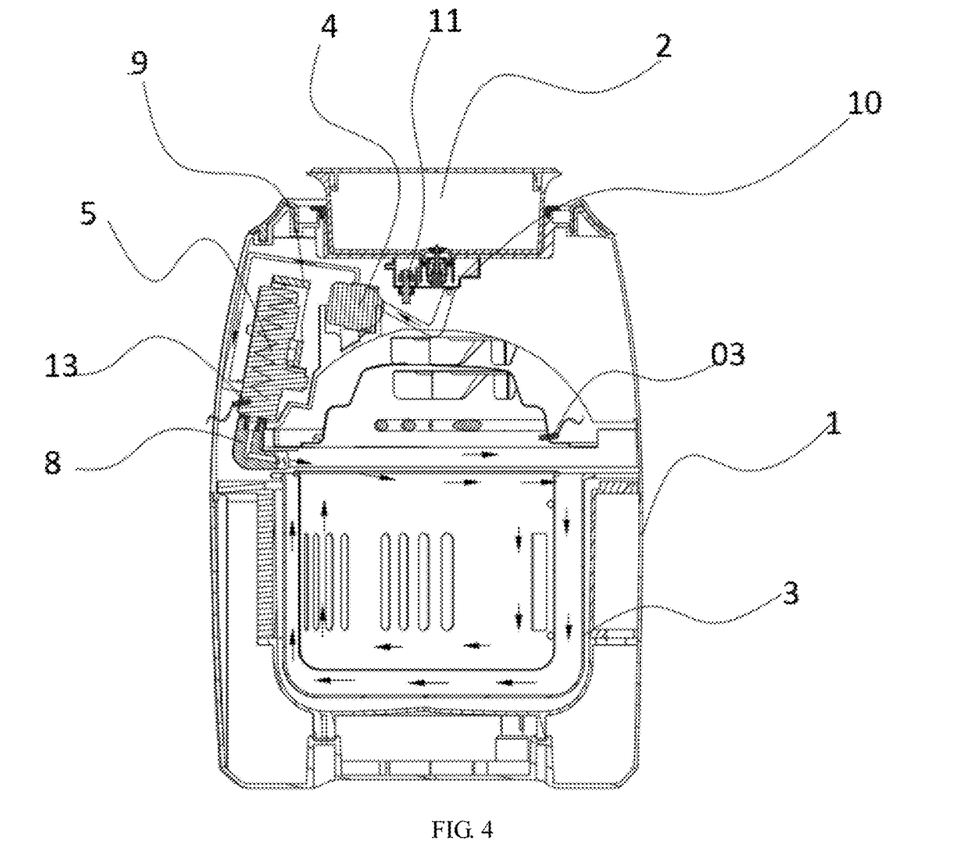
FIG. 4 is a schematic half-sectional view of a third structure of an air fryer with a steaming function including a steam generator according to the present disclosure.
Figure 5:
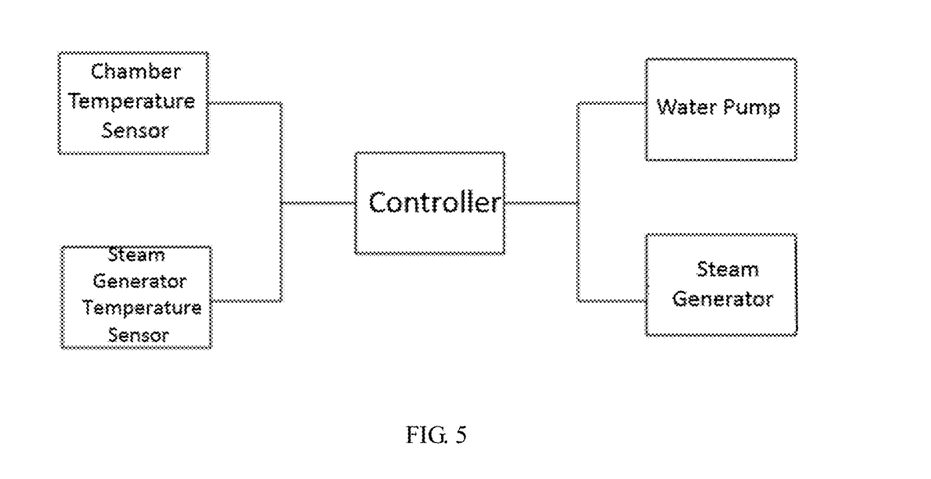
FIG. 5 is a schematic flowchart of a control system of the present disclosure.

As shown in FIGS. 4 and 5, an embodiment of the present disclosure relates to a steam generation system for an air fryer with a steaming function. The air fryer includes a main body 1 and a cooking chamber 3 arranged inside the main body 1. The steam generation system includes a controller, and a water tank 2, a water pump 4 and a steam generator 5 communicating with one another in sequence. The steam generator 5 is configured to spray steam into the cooking chamber 3. The controller is electrically connected to each of the water pump 4 and the steam generator 5.

A chamber temperature sensor 03 is provided in the cooking chamber 3. The chamber temperature sensor 03 is electrically connected to the controller for detecting the temperature T in the chamber and sending it to the controller.

Here, the controller is configured to perform control to reduce the amount of water pumped by the water pump and/or reduce the power of the steam generator when it is detected that $T \geq T_0$.

In one or more embodiments, the chamber temperature sensor 03 may detect the temperature T of steam inside the cooking chamber 3. A temperature $T_0$ between 90° C. and 95° C. is set in the controller. When the steam temperature $T \geq T_0$, the controller sends a signal to reduce the power of the heating element and the amount of water supplied by the water pump 4, to maintain the steam temperature with the lowest amount of steam supplied, thereby achieving the purpose of reducing the amount of water used and prolonging the time during which a tank of water is usable.

Here, there are two embodiments for reducing the amount of water supplied by the water pump 4. In the first embodiment, the controller reduces the amount of water pumped by the water pump 4 by adjusting timing of starting and stopping of the water pump 4. In the other embodiment, the controller reduces the amount of water pumped by the water pump 4 by adjusting the working frequency of the water pump 4. Both of these embodiments may be implemented by setting corresponding programs in the controller. These two embodiments may be used at the same time, or may be used alternatively.

A steam generator temperature sensor 13 is mounted in the steam generator 5. The steam generator temperature sensor 13 can control the temperature of high-temperature steam to meet different cooking requirements.

As an embodiment of the cooking chamber in the present disclosure, the cooking chamber 3 has a volume of 5 L, and the corresponding water tank 2 has a volume of 500 mL.

As another embodiment of the cooking chamber in the present disclosure, the cooking chamber 3 has a volume of 10 L, and the corresponding water tank 2 has a volume of 1,500 mL.

The volume of the water tank 2 may be adjusted as actually needed.

As an embodiment of the water tank, the water tank 2 includes a main water tank and a secondary water tank 10 located at the lower end of the main water tank. The secondary water tank 10 communicates with the main water tank. The water pump 4 is connected to the secondary water tank 10. The secondary water tank 10 allows the water tank 2 to be taken out conveniently and filled with water. A jacking structure is provided in the secondary water tank 10, so that water can flow down when the water tank 2 is put thereon.

Here, a liquid level sensor 11 is mounted at the bottom of the secondary water tank 10, and the liquid level sensor 11 is also connected to the controller. When the water in the water tank 2 is used up or the water tank 2 is taken out, the residual water in the secondary water tank 10 can be detected by the liquid level sensor 11, and the operation of the water pump 4 can be controlled by the controller to pump the residual water out of the secondary water tank 10.

In addition, an adapter 8 is mounted at the lower end of the steam generator 5. A plurality of vent holes are arranged evenly in the adapter 8 such that high-temperature steam is introduced into the cooking chamber therethrough. The adapter 8 can be conveniently cleaned and thus is more sanitary. High-temperature steam can be delivered evenly into the cooking chamber 3 through the plurality of vent holes. The steam generator 5 is mounted fixedly in the main body 1 by means of a supporting frame 9.

It can be seen that a unique control module and components are used in the present disclosure. The volume of the cooking chamber and the volume of the water tank are set to match each other, to ensure the practicability of the product. When steam is being produced, the starting, stopping, and working frequency of the water pump may be controlled to make full use of water to form steam. When the temperature of steam in the cooking chamber reaches a certain temperature during cooking, the amount of steam to be supplied may be reduced to reduce energy loss while ensuring full use of water.

Figure 6:
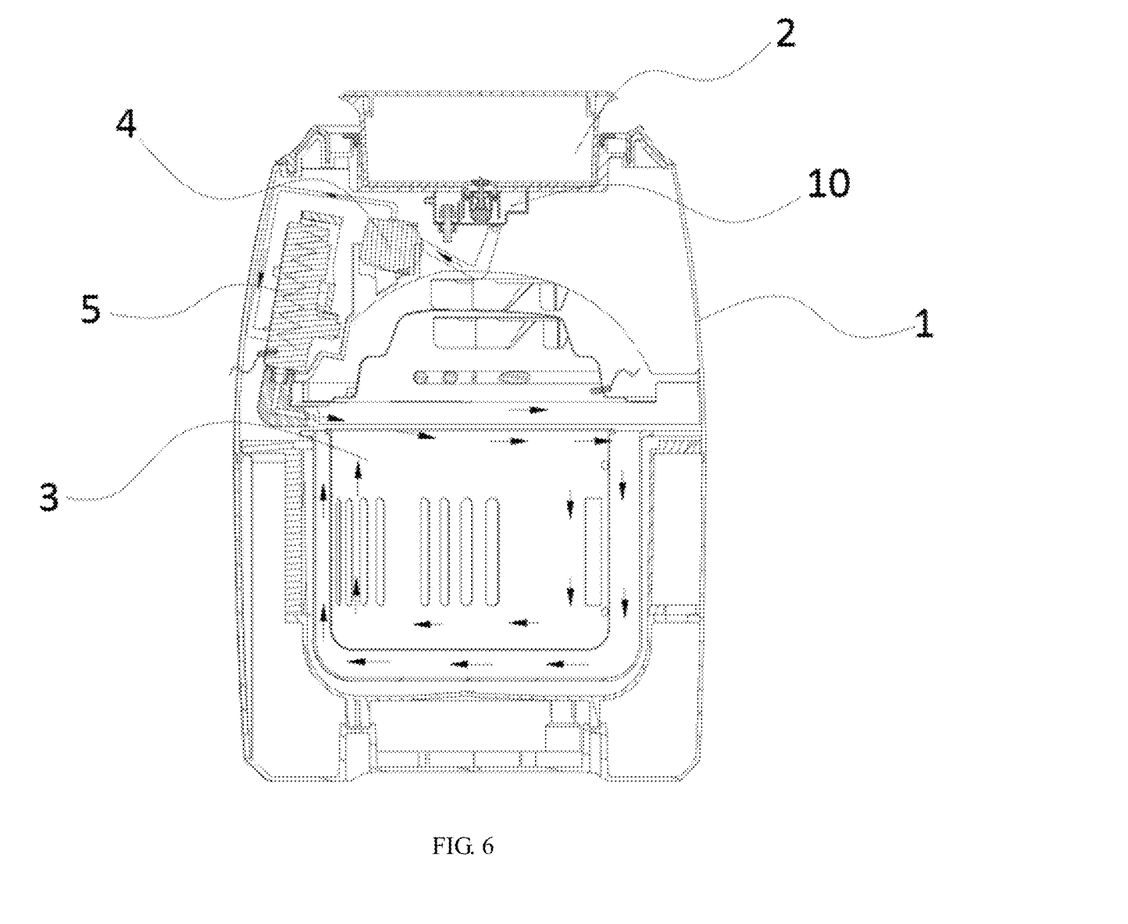
FIG. 6 is a schematic half-sectional view of the third structure of an air fryer with a steaming function including a steam generator according to the present disclosure.

As shown in FIG. 6, an embodiment of the present disclosure relates to a method for controlling an air fryer with a steaming function. The air fryer includes a cooking chamber 3 arranged inside a housing 1. A control unit is arranged inside the air fryer. The air fryer is provided with a water tank 2 which is connected to a steam generator 5 via a water pump 4. Steam is generated by the steam generator 5 and introduced into the cooking chamber 3. A one-key pumping button is provided on the housing 1. A pumping instruction is sent to the control unit by pressing the one-key pumping button. When the control unit receives the pumping instruction, the control unit controls the water pump 4 to start working so that the residual water accumulated in the water tank 2 is completely pumped out by the water pump 4.

If the air fryer with a steaming function is not continued to be used after cooking is completed, it is necessary to completely pump the remaining water from the water tank 2 in order to keep the water tank 2 clean. The steam generator 5 does not work when water is being pumped. Water remaining in the water tank 2 is pumped into the cooking chamber 3 by the water pump 4, and then it is only necessary to remove the water from the cooking chamber 3.

Here, a liquid level sensor is mounted at the bottom of the water tank 2 for sending a signal indicating that water has been completely pumped out. When the liquid level sensor detects that the water level has reached the bottom, the water pump 4 will be automatically controlled to stop working.

As an embodiment of the water tank, the water tank 2 includes a main water tank and a secondary water tank 10 arranged at the lower end of the main water tank and communicating with the main water tank. The water pump 4 is connected to the secondary water tank 10 via a water pipe. The water tank 2 can be separated from the secondary water tank 10 so that it is convenient to remove the water tank 2 and add water thereto. A drainage mechanism is arranged between the water tank 2 and the secondary water tank 10. Water in the water tank 2 firstly enters the secondary water tank 10, thus water is also accumulated in the secondary water tank 10. Therefore, a liquid level sensor 11 is mounted at the bottom of the secondary water tank 10 to ensure complete pumping of the water.

As an embodiment relating to steam cleaning and disinfection of an air fryer with a steaming function in the present disclosure, a one-key cleaning button is provided on the housing 1. A cleaning instruction is sent to the control unit by pressing the one-key cleaning button. When the control unit receives the cleaning instruction, the control unit controls the water pump 4 and the steam generator 5 to work, so that the steam generator 5 sprays high-temperature steam into the cooking chamber 3, to clean and disinfect the tiny spaces inside the cooking chamber 3.

Here, the steam sprayed from the steam generator 5 after the one-key cleaning button is pressed by the user has a temperature higher than the temperature of the steam generated during normal cooking. The cleaning and disinfecting effects can be improved by the steam at a higher temperature.

Here, the one-key cleaning step includes the following two steps:

step 1: adding a little disinfectant or detergent to the water tank 2 and generating disinfectant steam by the steam generator 5 to clean and disinfect each position in the cooking chamber before use; and step 2: adding clean water to the water tank 2 and generating high-temperature water steam by the steam generator 5 to further clean each position in the cooking chamber after the disinfectant is completely used.

In a specific embodiment relating to incrustation scale detection and reminding functions in an air fryer with a steaming function in the present disclosure, the air fryer includes a cooking chamber 3 arranged inside a housing 1. A control unit is arranged inside the air fryer. The air fryer is provided with a water tank 2 which is connected to a steam generator 5 via a water pump 4. Steam is generated by the steam generator 5 and introduced into the cooking chamber 3. A temperature sensor is mounted in the steam generator 5. The temperature of the heating chamber inside the steam generator 5 is detected by the temperature sensor. A temperature change rate during heating is detected, and changes in the temperature change rate are compared to detect whether incrustation scale is generated in the heating chamber. Generally, if the temperature in the heating chamber changes quickly, it is meant that there is less incrustation scale in the steam generator 5. If the temperature in the heating chamber changes slowly as the air fryer is used for a relatively long time, it is meant that incrustation scale is generated in the steam generator 5. When the temperature change rate is reduced to a certain value, it is necessary to replace the steam generator 5 or perform a treatment to clean the incrustation scale off the heating chamber of the steam generator 5. The controller may detect the temperature change rate and issue a reminder. The reminder may be issued in many ways, for example, by turning on a light or by making a sound.

The present disclosure also includes another incrustation scale detection and reminding method for an air fryer with a steaming function. Here, the control unit includes a timing unit, and a time T0 during which the steam generator is theoretically used is set. The timing unit is configured to calculate a time T during which the steam generator 5 is actually used. The control unit prompts to remove incrustation scale and recommends the user to remove the incrustation scale when T≥T0.

In addition, a control panel communicating with the control unit is arranged on the outer side of the air fryer. The control panel may be provided with buttons for controlling various functions and set with parameters, and may be provided with an indicator light and a speaker to meet the voice prompt function.

A temperature sensor is mounted in each of the cooking chamber 3 and the steam generator 5, to facilitate feedback and control of the temperatures of steam in the cooking chamber 3 and in the steam generator 5, to facilitate control by the controller.

It can be seen that the control method of the present disclosure allows effective removal of the accumulated water from the water tank and further allows cleaning and disinfection of the cooking chamber, and also involves the incrustation scale detection and reminding functions.

Although the present disclosure has been described above with reference to the embodiments, various modifications may be made thereto and the components therein may be replaced with equivalents without departing from the scope of the present disclosure. In particular, the various features in the embodiments disclosed in the present disclosure may be combined with each other in any manner as long as there is no structural conflict. Those combinations are not exhaustively described in this specification only for the sake of reducing space and saving resources. Therefore, the present disclosure is not limited to the specific embodiments disclosed herein, but includes all the technical solutions falling within the scope of the claims.

INDUSTRIAL APPLICABILITY

The present disclosure provides a steam generator and a steaming/roasting control method for an air fryer with a steaming function, and a method for controlling an air fryer with a steaming function. The entire process of generating steam by the steam generator is carried out inside a casting, thus heat loss is reduced during heat transfer. In addition, the amount of water supplied by the water pump is substantially in equilibrium with the amount of steam generated by the heater during heating, thus heat loss is reduced during heating of the liquid. All the heat energy generated by the heater is converted into steam and used for steam heating, whereby the thermal efficiency is significantly improved. Noise generated when the liquid is vaporized is blocked by the external casting, so that noise will be significantly reduced during use. In addition, a water level detection device is mounted at the lowest water level of the water tank. When there is a lack of water, the control system will automatically deactivate the steam generator and the water pump and prompt the user to add water, thereby improving the service life and reducing the heat loss of the steam generator and the water pump. When the water supply pipeline is blocked or other abnormal conditions occur, a temperature controller mounted to the casting will automatically turn off the heater to ensure the safety of the user. A straight-through electric heating steam generator with high thermal efficiency, fast steam generation speed, less steam spray, and low noise is coordinated with a corresponding control system to meet the requirement of adding the function of heating food with steam to the electric air fryer. A unique control module and components are used, and the volume of the cooking chamber and the volume of the water tank are set to match each other to ensure the practicability of the product. When steam is being produced, the starting, stopping, and working frequency of the water pump may be controlled to make full use of water to form steam. When the temperature of steam in the cooking chamber reaches a certain temperature during cooking, the amount of steam supplied may be reduced to reduce energy loss while ensuring full use of water. Moreover, this control method allows effective removal of the accumulated water from the water tank and the secondary water tank, further allows cleaning and disinfection of the cooking chamber with high-temperature steam, and allows detection and reminding of the incrustation scale state in the steam generator, so as to solve multiple technical problems of an air fryer with a steaming function. In this way, the air fryer is more sanitary during cooking and its service life is also prolonged to a certain extent.

What is claimed is:

1. An air fryer with a steaming function, comprising a cooking chamber and a water tank which are arranged inside a housing, wherein
the air fryer is further provided therein with a control unit and a steam generator,
a heating chamber is provided in the steam generator,
the heating chamber in the steam generator is connected to the water tank via a water pump,
high-temperature steam generated in the heating chamber of the steam generator is introduced into the cooking chamber,
a chamber temperature sensor is arranged in the cooking chamber,
each of the chamber temperature sensor, the steam generator and the water pump is electrically connected to the control unit,
the cooking chamber has a volume of 5 to 10 L,
wherein the water tank comprises a main water tank and a secondary water tank mounted at a lower end of the main water tank, wherein the main water tank is detachably mounted onto the secondary water tank, the main water tank has the volume of 500 to 1,500 mL, the secondary water tank communicates with the main water tank, the water pump is connected to the secondary water tank, a water level sensor is mounted at a bottom of an inner side of the secondary water tank, and the water level sensor is electrically connected to the control unit,
wherein a one-way valve is mounted at a steam outlet end of the heating chamber of the steam generator, wherein a steam outlet end of the one-way valve is connected to a steam adapter via an adapting member, one end of the steam adapter leads into the cooking chamber, and a plurality of corresponding steam transmission holes are arranged side by side in both the adapting member and the steam adapter.

2. The air fryer with a steaming function according to claim 1, wherein the steam generator is equipped with an over-temperature protector and a temperature sensor, and both the over-temperature protector and the temperature sensor are electrically connected to the control unit.

3. The air fryer with a steaming function according to claim 2, wherein the steam generator comprises a sealed housing casting, and each of the heating chamber, the over-temperature protector, and the temperature sensor is arranged in the housing casting.

4. A method for controlling an air fryer with a steaming function,
wherein the air fryer comprises a cooking chamber and a water tank,
the cooking chamber and the water tank are arranged inside a housing,
the air fryer is further provided therein with a control unit and a steam generator,
a heating chamber is provided in the steam generator,
the heating chamber in the steam generator is connected to the water tank via a water pump,
high-temperature steam generated in the heating chamber of the steam generator is introduced into the cooking chamber,
a chamber temperature sensor is arranged in the cooking chamber,
each of the chamber temperature sensor, the steam generator and the water pump is electrically connected to the control unit,
the cooking chamber has a volume of 5 to 10 L,
wherein the water tank comprises a main water tank and a secondary water tank mounted at a lower end of the main water tank, wherein
the main water tank is detachably mounted onto the secondary water tank, the main water tank has a volume of 500 to 1,500 mL,
the secondary water tank communicates with the main water tank, the water pump is connected to the secondary water tank,
a water level sensor is mounted at a bottom of an inner side of the secondary water tank, and
the water level sensor is electrically connected to the control unit;
wherein a one-way valve is mounted at a steam outlet end of the heating chamber of the steam generator, wherein a steam outlet end of the one-way valve is connected to a steam adapter via an adapting member, one end of the steam adapter leads into the cooking chamber, and a plurality of corresponding steam transmission holes are arranged side by side in both the adapting member and the steam adapter;
wherein the method for controlling the air fryer comprises steps of:
S1: filling the water tank with water for generating steam, and controlling, before generating the steam, the heating chamber of the steam generator to be preheated, and causing the control unit to automatically activate the water pump connected to a water pipe to inject water in the water tank, from the water tank into the steam generator, through a connecting pipeline, when a temperature sensor detects that a temperature of the heating chamber increases to a predetermined temperature required for vaporization of a liquid; and
S2: causing a temperature of the water in the heating chamber to be rapidly increased to a vaporization temperature and the water to be vaporized into water steam, when a volume of the water steam expands violently and generating a predetermined pressure to push the one-way valve, discharging the water steam at high temperature and high pressure to the cooking chamber through a steam pipeline to heat food.

5. The method according to claim 4, further comprising a step of:
S3: causing the control unit to automatically deactivate the water pump or reduce a flow rate from the water pump, when the temperature sensor detects that the temperature of in the steam generator fails to reach a vaporization temperature.

6. The method according to claim 5, further comprising a step of:

S4: using the chamber temperature sensor to detect a temperature T in the cooking chamber and send the temperature T to the control unit, and performing control to reduce an amount of water pumped by the water pump and/or reduce a power of the steam generator, when T is detected as larger than or equal to a temperature $T_0$.

7. The method according to claim 6, wherein $T_0$ is set between 90° C. and 95° C.

8. The method according to claim 6, wherein the control unit reduces the amount of water pumped by the water pump by adjusting timing of starting and stopping of the water pump.

9. The method according to claim 6, wherein the control unit reduces the amount of water pumped by the water pump by adjusting a working frequency of the water pump.

10. The method according to claim 4, wherein when the water level sensor senses that water is insufficient, the steam generator and the water pump are controlled to be deactivated, and the water level sensor prompts that water needs to be added.

11. The method according to claim 4, wherein a one-key pumping button is provided on the housing, a pumping instruction is sent to the control unit by pressing the one-key pumping button, and when the control unit receives the pumping instruction, the control unit controls the water pump to start working, and residual water accumulated in the water tank is completely pumped out by the water pump.

12. The method according to claim 11, wherein the water level sensor is configured to send a signal indicating that water has been completely pumped out of the control unit, and the control unit controls the water pump to stop working.

13. The method according to claim 4, wherein a one-key cleaning button is provided on the housing, a cleaning instruction is sent to the control unit by pressing the one-key cleaning button, and when the control unit receives the cleaning instruction, the control unit controls the water pump and the steam generator to work, and the steam generator sprays high-temperature steam into the cooking chamber to clean and disinfect the cooking chamber.

14. The method according to claim 13, wherein the high-temperature steam sprayed from the steam generator, after the one-key cleaning button is pressed, is at a temperature higher than a temperature of the steam generated during normal cooking.

15. The method according to claim 13, wherein a one-key cleaning step comprises two steps of:

S1: adding, before use, disinfectant or detergent to the water tank and generating disinfectant steam by the steam generator to clean and disinfect each position in the cooking chamber; and S2: adding clean water to the water tank and generating high-temperature water steam by the steam generator to further clean each position in the cooking chamber, after the disinfectant is completely used.

16. The method according to claim 4, wherein the temperature sensor of the heating chamber is mounted in the steam generator, the temperature of the heating chamber inside the steam generator is detected by the temperature sensor, and the control unit detects a temperature change rate during heating, detects whether incrustation scale is generated in the heating chamber by comparing changes in the temperature change rate, and prompts to remove the incrustation scale from the steam generator.

17. The method according to claim 4, wherein the control unit comprises a timing unit, wherein a time T0 is set, with the steam generator being theoretically used during T0, the timing unit is configured to calculate a time T of actually using the steam generator, and the control unit prompts to remove incrustation scale from the steam generator, when T≥T0.

\* \* \* \* \*